(12) United States Patent
Chen et al.

(10) Patent No.: US 11,237,654 B2
(45) Date of Patent: Feb. 1, 2022

(54) TOUCH DISPLAY AND METHOD FOR CONTROLLING THE SAME

(71) Applicant: AU OPTRONICS CORPORATION, Hsin-Chu (TW)

(72) Inventors: Chi-Cheng Chen, Hsin-Chu (TW); Gui-Wen Liu, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

(21) Appl. No.: 16/827,882

(22) Filed: Mar. 24, 2020

(65) Prior Publication Data

US 2020/0310566 A1    Oct. 1, 2020

(30) Foreign Application Priority Data

Mar. 29, 2019    (TW) .................................. 108111378

(51) Int. Cl.
*G06F 3/041*    (2006.01)
*G06F 3/00*    (2006.01)

(52) U.S. Cl.
CPC .............. *G06F 3/041* (2013.01); *G06F 3/007* (2013.01)

(58) Field of Classification Search
CPC ........ G06F 3/041; G06F 3/044; G06F 3/0412; G06F 2203/04103; G06F 3/0488; G06F 2203/04102; G06F 3/016; G06F 3/0445
See application file for complete search history.

(56) References Cited

U.S. PATENT DOCUMENTS

| | | | | |
|---|---|---|---|---|
| 7,683,887 | B2 * | 3/2010 | Yasukawa | G06F 3/0412 345/173 |
| 8,115,746 | B2 * | 2/2012 | Tsai | G06F 3/04164 345/173 |
| 9,285,937 | B2 | 3/2016 | Kida et al. | |
| 9,298,307 | B2 | 3/2016 | Chen et al. | |
| 9,436,315 | B2 * | 9/2016 | Krah | G06F 3/04184 |
| 2002/0024624 | A1 * | 2/2002 | Takenaka | G02F 1/133604 349/110 |
| 2002/0180710 | A1 * | 12/2002 | Roberts | G06F 3/04142 345/173 |
| 2003/0011583 | A1 * | 1/2003 | Yamazaki | G09G 3/367 345/204 |
| 2009/0219242 | A1 | 9/2009 | Fuchigami et al. | |
| 2010/0253639 | A1 * | 10/2010 | Huang | G06F 3/04166 345/173 |

(Continued)

FOREIGN PATENT DOCUMENTS

| CN | 102929460 A | 2/2013 |
|---|---|---|
| CN | 203982752 U | 12/2014 |

(Continued)

*Primary Examiner* — Olga V Merkoulova
(74) *Attorney, Agent, or Firm* — WPAT, PC

(57) ABSTRACT

A touch display and method for controlling the same are provided. The touch display includes a gate driver circuit, a touch sensor and a display panel. The method includes: when the touch sensor detects no touch input signal, the gate driver circuit outputs a plurality of first gate signals to the display panel at a first frequency; and when the touch sensor detects a touch input signal, the gate driver circuit outputs a plurality of second gate signals to the display panel at a second frequency. The second frequency is smaller than the first frequency.

9 Claims, 13 Drawing Sheets

(56) References Cited

U.S. PATENT DOCUMENTS

| | | | |
|---|---|---|---|
| 2012/0162124 A1* | 6/2012 | Lin | G06F 3/041 |
| | | | 345/174 |
| 2013/0069894 A1* | 3/2013 | Chen | G06F 3/0412 |
| | | | 345/173 |
| 2014/0062918 A1* | 3/2014 | Chen | G06F 3/0412 |
| | | | 345/173 |
| 2014/0184539 A1* | 7/2014 | Shin | G06F 3/041661 |
| | | | 345/173 |
| 2015/0097817 A1* | 4/2015 | Chung | G06F 3/04184 |
| | | | 345/206 |
| 2015/0144920 A1* | 5/2015 | Yamazaki | G06F 3/0447 |
| | | | 257/40 |
| 2017/0010739 A1* | 1/2017 | Ito | G06F 3/0412 |
| 2017/0076079 A1* | 3/2017 | Ran | G06F 1/1684 |
| 2017/0102801 A1* | 4/2017 | Ko | G06F 3/04166 |
| 2017/0123529 A1 | 5/2017 | Ho | |
| 2018/0095658 A1* | 4/2018 | Tokutake | G06F 3/04883 |
| 2020/0310566 A1* | 10/2020 | Chen | G06F 3/041 |

FOREIGN PATENT DOCUMENTS

| | | |
|---|---|---|
| TW | 201433957 A | 9/2014 |
| TW | 201716969 A | 5/2017 |

\* cited by examiner

TOUCH DISPLAY AND METHOD FOR CONTROLLING THE SAME

BACKGROUND OF THE INVENTION

1. Field of the Invention

The present disclosure relates to a touch display method and a touch display device, especially a touch display method and a touch display device enhancing touch efficiency.

2. Description of the Prior Art

Along with the development of display technologies, adding touch function in displays is a more and more common request. Development of the current touch display technologies mainly focuses on the capacitance touch technology. The conventional capacitance touch panel has touch sensor circuits disposed on conductive glass located at both sides of the liquid crystal layer. The touch sensor circuits may include a transmission electrode and a receiving electrode, wherein the transmission electrode provides a line of electric force to the receiving electrode so that capacitance is formed by the transmission electrode and the receiving electrode. When a human body touches the surface of display panel, the shape of the line of electric force is changed due to the conductivity of the human body itself. Then, the touched position is detected by calculating the variance of the capacitance value using the receiving electrode.

Generally speaking, if the direction that the light comes out is from the bottom up, and the touch circuit is disposed on a cover glass and attached on an upper layer conductive glass in the panel, this type of touch display panel structure is called an Out-Cell; if the touch circuit is formed on the upper layer conductive glass, it is called an On-Cell; if the touch circuit is disposed between the upper layer conductive glass and the bottom layer conductive glass, it is called an In-Cell.

In the development process of integrating the touch functions on the display device, noise is consistently one of the problems to solve. For the structures of On-cell and Out-Cell, although they have the advantage that the touch circuit may be driven at the same time with a driver circuit, however, signal transmission of the touch circuit can be easily affected by the noise of the display panel. On the other hand, in a touch display device of In-Cell structure, the touch circuit and the display driver circuit should be driven at different time; therefore, the touch circuit is not easily affected by the display driver circuit. However, along with the increase of requested resolution, pixel charge rate might be insufficient if the touch circuit and the display driver circuit are operated separately. In summary, the current touch display device still has room for improvement.

SUMMARY OF THE INVENTION

As mentioned above, the present disclosure is intended to provide a touch display method and a touch display device to reduce noise in display panels and enhance touch efficiency during touching operation.

One of the technical ways of the present disclosure provides a touch display method for driving a touch display device. The touch display device includes a gate driver circuit, a touch sensor module and a display panel. The touch display method includes: the gate driver circuit sequentially outputting a plurality of first gate signals to the display panel at a first frequency when the touch sensor module does not detect a touch input signal; and the gate driver circuit sequentially outputting a plurality of second gate signals to the display panel at a second frequency when the touch sensor module detects the touch input signal, wherein the second frequency is smaller than the first frequency.

Another one technical way of the present disclosure provides a touch display device which includes a display panel, a touch sensor module, and a gate driver circuit. The touch sensor module is disposed on the display panel. The gate driver circuit is coupled to the display panel, The gate driver circuit is configured to sequentially output a plurality of first gate signals to the display panel at a first frequency when the touch sensor module does not detect a touch input signal and the gate driver circuit is configured to sequentially output a plurality of second gate signals to the display panel at a second frequency when the touch sensor module detects the touch input signal, wherein the second frequency is smaller than the first frequency.

To further understand the technical features and contents of the present disclosure, please refer to the following specifications and FIGS. of the present disclosure; however, the provided FIGS. are simply used for reference and illustration and not intended to limit the scope of the present disclosure.

DETAILED DESCRIPTION OF THE PREFERRED EMBODIMENT

Figure 1:
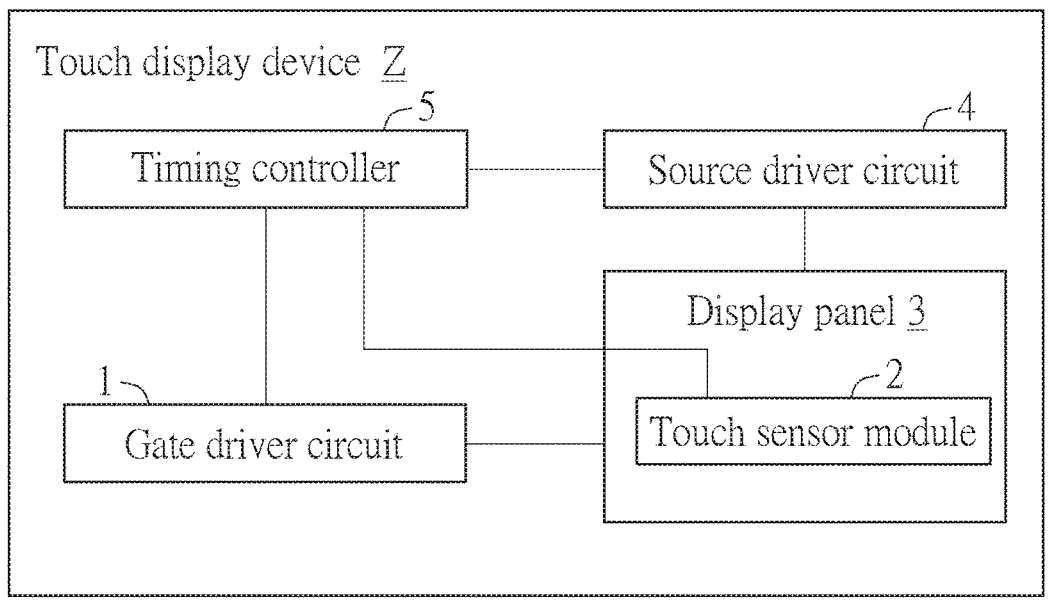
FIG. 1 is a functional block diagram of a touch display device of the first embodiment of the present disclosure.

In the following sections, the touch display method and the touch display device of the present disclosure is described through the specific embodiments in reference to FIG. 1 to FIG. 14. A person having ordinary skill in the art may understand the advantages and effects of the present disclosure through the contents disclosed in the present specification. However, the contents shown in the following sentences never limit the scope of the present disclosure. Without departing from the conception principles of the present invention, a person having ordinary skill in the present art may realize the present disclosure through other embodiments based on different views and applications. In the attachment FIGs, thickness of layers, films, panels, areas are exaggerated for clarity. In the whole specification, the same labels mean the same components. In the attached FIGs, for the purpose of clarification, the thicknesses of layers, films, panels, regions and the like are amplified. In the whole specification, the same marks represent the same element. It should be understood that, when an element such as a layer, a film, a panel, a region or a substrate are described as "being on" or "being connected to" another element, they may be directly on or connected to another element, or there may be other elements therebetween. On other hands, when an element is described as "directly existing on another element" or "directly connecting to" another element, there is no element therebetween. As used in the present specification, a "connection" may be a physical and/or electrical connection. In addition, an "electrical connection" or "coupling" means that other elements may exist therebetween.

It should be understood that, even though the terms such as "first", "second", "third" may be used to describe an element, a part, a region, a layer and/or a portion in the present specification, but these elements, parts, regions, layers and/or portions are not limited by such terms. Such terms are merely used to differentiate an element, a part, a region, a layer and/or a portion from another element, part, region, layer and/or portion. Therefore, in the following discussions, a first element, portion, region, layer or portion may be called a second element, portion, region, layer or portion, and do not depart from the teaching of the present disclosure.

The terms used in the present specifications are merely intended to describe a specific embodiment, and not intended to limit them. Single forms used in the present specification such as "a", "one" and "the" includes multiple forms such as "at least one"; "or" represents "and/or" unless described clearly. Terms used in the present specification such as "and/or" includes one or a plurality of related items and any or all combinations of them. It should be understood that one or more features, areas, wholes, steps, operations, components, elements and/or combinations thereof might exist when terms "comprise" and/or "include" are used for describing features, areas, wholes, steps, and operations, existence of components and elements.

The First Embodiment

The first embodiment of the present disclosure is described as follows in reference to FIG. 1 to FIG. 5. Please refer to FIG. 1 at first. A touch display device Z provided by the present embodiment includes a gate driver circuit 1, a touch sensor module 2, a display panel 3, a source driver circuit 4, and a timing controller 5. The gate driver circuit 1 and the source driver circuit 4 are respectively coupled between the timing controller 5 and the display panel 3, wherein the gate driver circuit 1 is configured to input a gate driver signal to the display panel 3 to switch on a transistor of pixels in the display panel 3; the source driver circuit 4 is configured to input a pixel voltage when the transistor of the pixels of the display panel 3 is conductive; the timing controller 5 is configured to control the timing of the gate driver circuit 1 and the source driver circuit 4 output.

Figure 2:
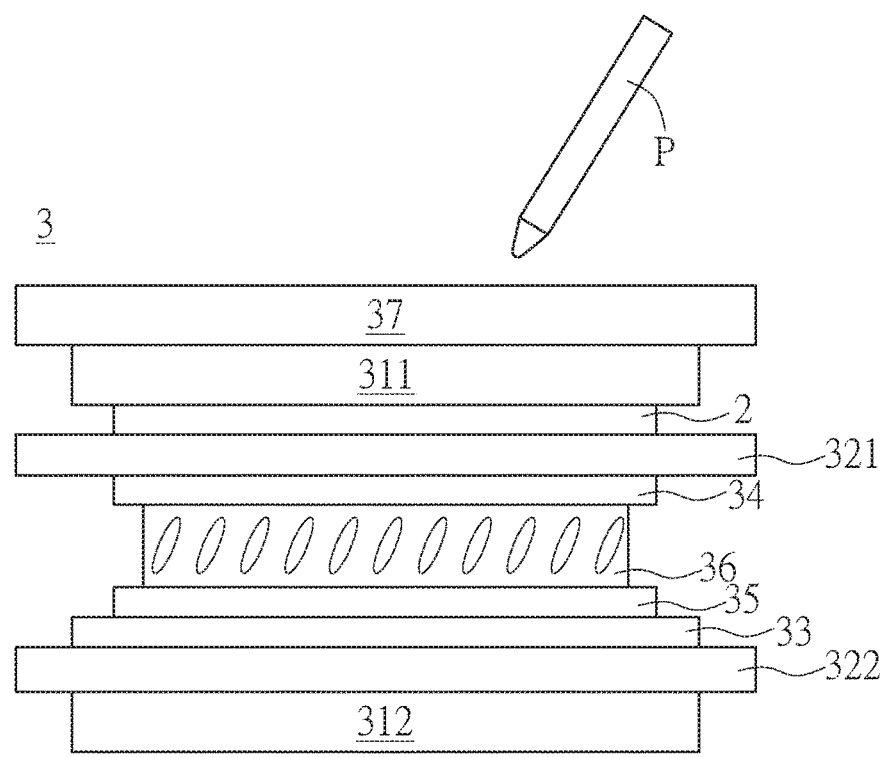
FIG. 2 is a diagram of a display panel of the first embodiment of the present disclosure.

The touch display device of the present embodiment has a display panel 3 with an On-Cell structure. Specifically, please refer to FIG. 2 illustrating a diagram of the display panel 3 of the present embodiment. The display panel 3 includes an upper polarizer 311, a lower polarizer 312, an upper substrate 321, a lower substrate 322, the TFT (Thin Film Transistor) array 33, a color filter layer 34, a common electrode layer 35, a liquid crystal layer 36, a cover glass 37, and a touch sensor module 2. As shown in FIGs, the touch sensor module 2 of the present embodiment is disposed between the upper substrate 321 and the upper polarizer 311. This is the basic structure of the On-Cell touch display device. In the present embodiment, the cover glass 37 (Cover Glass) is disposed on the side of the upper polarizer 311 away from the liquid crystal layer 36, and in an actual application, a backlight module is disposed on the side of the lower polarizer 312 away from the liquid crystal layer 36. Light displayed by the display panel 3 is emitted from the backlight module and leaves the display panel 3 through the cover glass 37 after being modulated by the liquid crystal layer 36. The cover glass 37 is treated as an interface of the touch sensor module 2 sensing touch operation at the same time. The touch operation, for example, may be operated on the cover glass 37 by fingers or touch object P. A touch pen is taken as an example of the touch object P in FIG. 3; however, the present disclosure is not limited thereto. Since the basic structure of the On-Cell touch display device is conventional, other detailed features are not described here. In the following paragraphs, a touch operation is indicated by a touch input signal TC. When the touch input signal TC is in an enable state, it indicates that a touch operation has occurred; when the touch input signal TC is in a disable state, it indicates that no touch operation has occurred.

Figure 3:
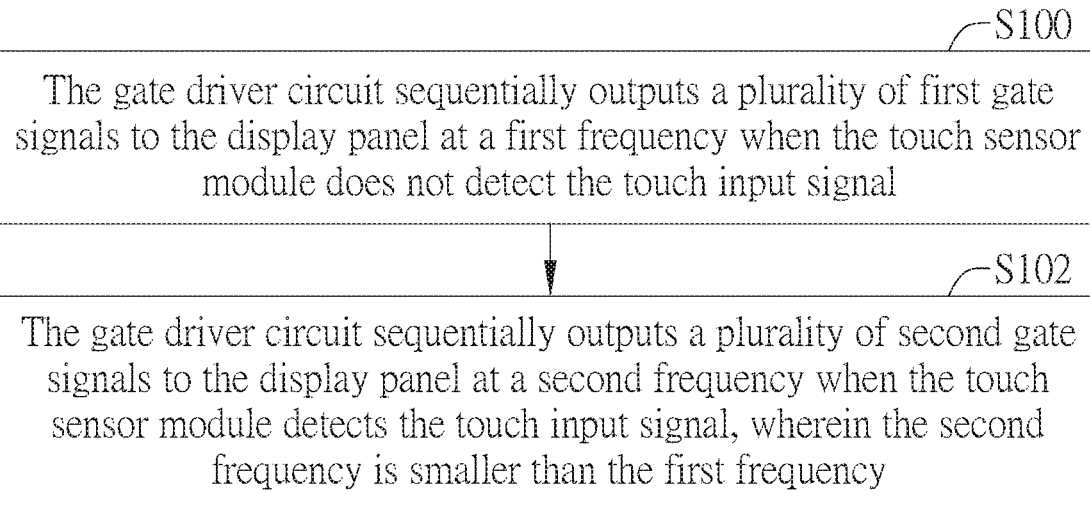
FIG. 3 is a flowchart of a touch display method of the first embodiment of the present disclosure.
Figure 4:
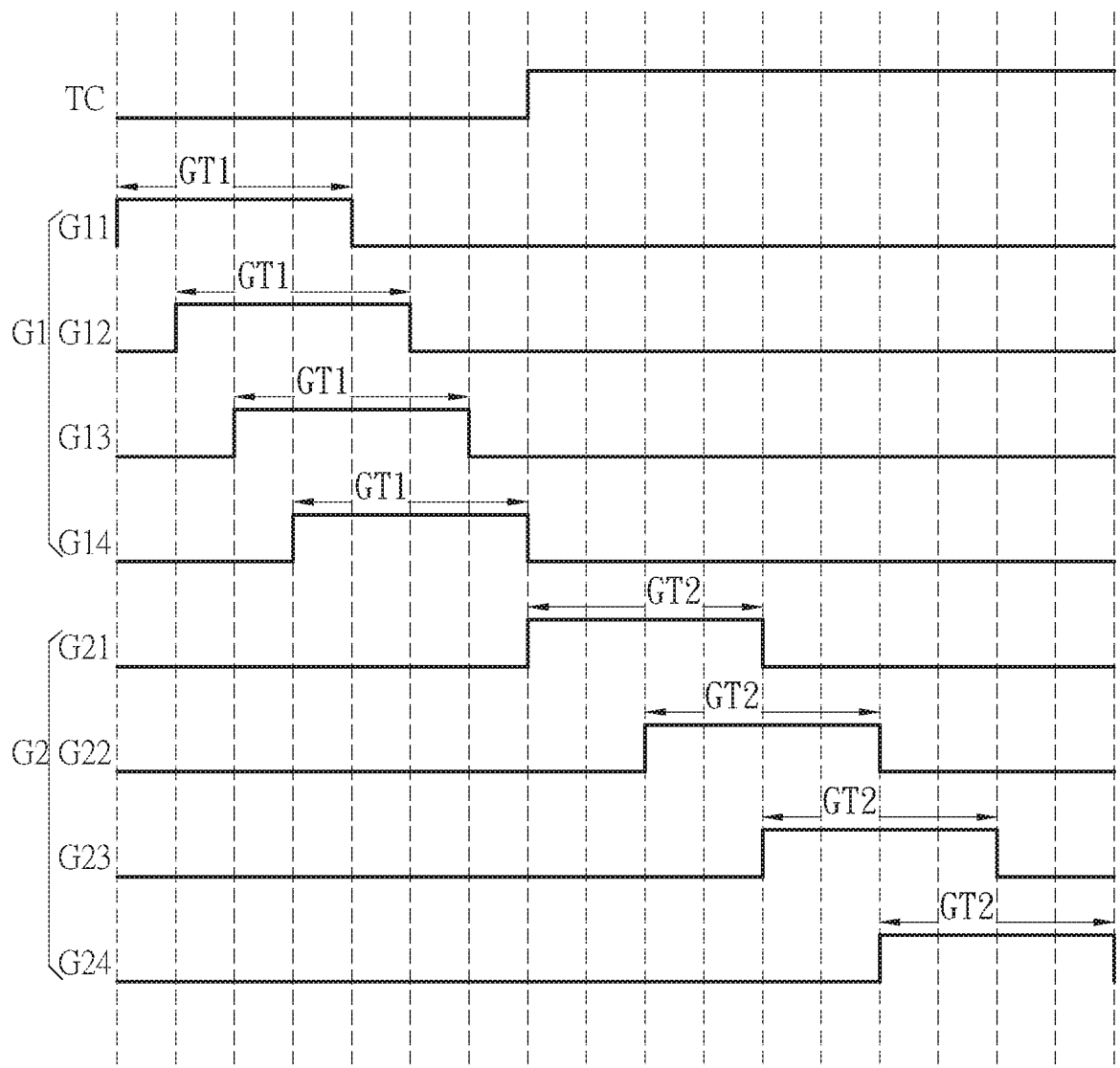
FIG. 4 illustrates wavelength generated when operating a gate driver circuit of the first embodiment of the present disclosure according to the touch display method illustrated in FIG. 3.
Figure 5:
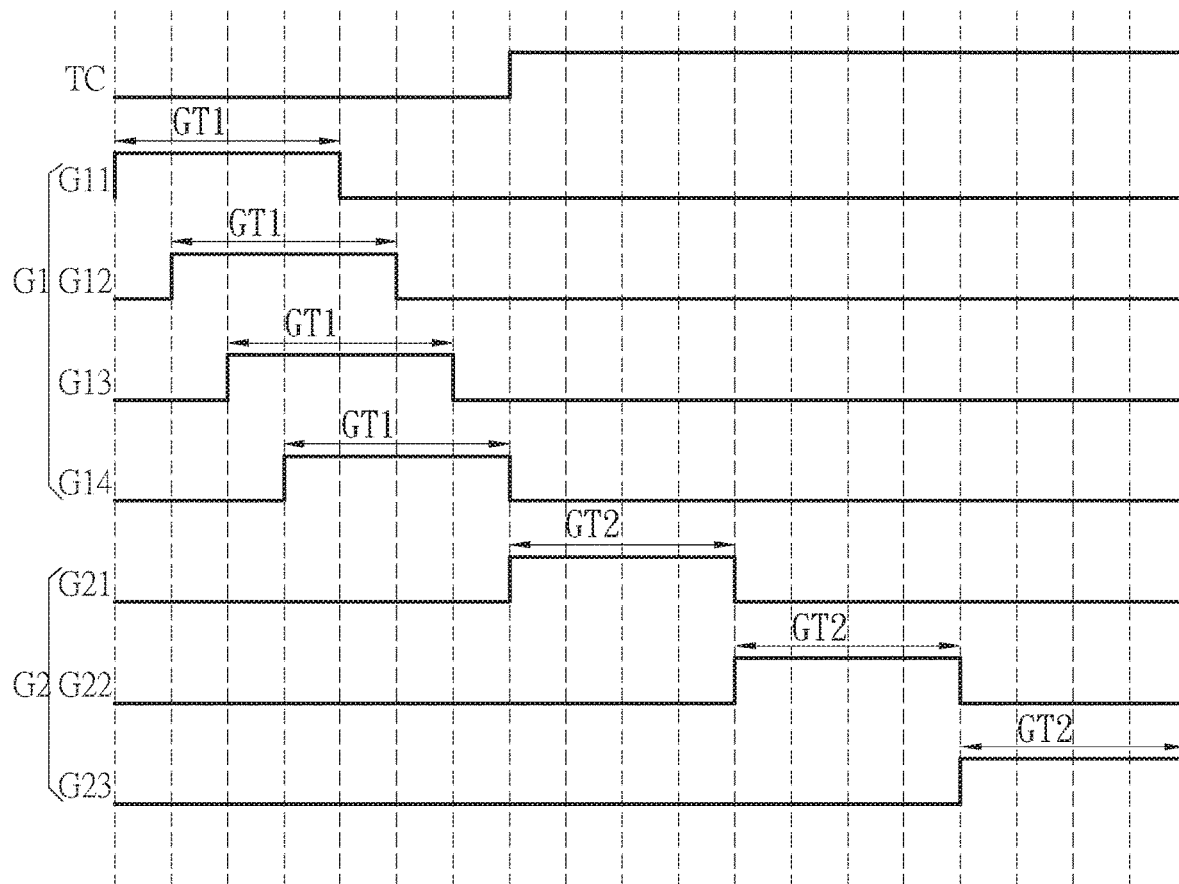
FIG. 5 illustrates a variant embodiment of the wavelength generated when operating the gate driver circuit of the first embodiment of the present disclosure according to the touch display method illustrated in FIG. 3.

Please refer to FIG. 1, FIG. 3 and FIG. 4. FIG. 3 illustrates a touch display method provided by the first embodiment of the present disclosure applied on the touch display device Z as shown in FIG. 1. As shown in FIG. 3, the touch display method provided by embodiments of the present disclosure includes at least the following steps. Step S100: the gate driver circuit 1 sequentially outputs a plurality of first gate signals to the display panel 3 at a first frequency when the touch sensor module 2 does not detect the touch input signal TC; and step S102: the gate driver circuit 1 sequentially outputs a plurality of second gate signals to the display panel 3 at a second frequency when the touch sensor module 2 detects the touch input signal TC, wherein the second frequency is smaller than the first frequency. FIG. 4 illustrates a waveform output by the gate driver circuit 1 according to the touch display method illustrated in FIG. 3. Please refer to FIG. 4. Step S100 and step S102 respectively correspond to the period before and after the touch input signal TC starts to be transmitted. Wherein, the gate driver circuit 1 outputs a plurality of first gate signals G1 before the touch input signal TC starts to be transmitted; the gate driver circuit 1 outputs a plurality of second gate signals G2 after the touch input signal TC starts to be transmitted. As shown in FIG. 4, output time intervals between the first gate signals (G11, G12, G13, and G14) are small, and output time intervals between the second gate signals (G21, G22, G23, and G24) are large; that is, the second frequency which outputs the second gate signals (G21, G22, G23, and G24) is smaller than the first frequency which outputs the first gate signals (G11, G12, G13, and G14).

In general, noise in the Thin Film Transistor-Liquid Crystal Display panel (TFT-LCD) is mainly from the signal variance of gate lines, data lines, and multiplexers. In the present embodiment, the number of signal variance per unit time in the display panel 3 may be decreased by decreasing the frequencies of the gate driven signals output by the gate driver circuit 1 (that is, the first gate signal G1 and the second gate signal G2), that is, decreasing from the first frequency to the second frequency when the touch sensor module 2 is activated. Thus, a noise's influence on signal determination of the touch sensor module 2 is reduced.

Please refer to FIG. 4. For example, the first gate signals (G11, G12, G13, and G14) may be respectively emitted by four adjacent shift resisters in a gate driver circuit 1, and each of the first gate signals (G11, G12, G13, and G14) respectively opens its corresponding pixels in the display panel 3 during a first input period GT1; the second gate signals (G21, G22, G23, and G24) may be respectively emitted by other four adjacent shift resisters in the gate driver circuit 1, and each of the second gate signals (G21, G22, G23, and G24) respectively opens its corresponding pixels in the display panel 3 during a second input period GT2. Specifically, signals of gate lines in the display panel 3 are varied when the first gate signals (G11, G12, G13, and G14) and the second gate signals (G21, G22, G23, and G24) are input to the display panel 3 to open corresponding pixels. If the signal variance is too intensive, signal determination of the touch sensor module 2 can be easily affected. Thus, pixel charge time of each gate line is increased by reducing output frequency of the second gate signals (G21, G22, G23, and G24), and influence on the touch sensor module 2 when it is activated may be reduced.

In addition, in the embodiment in FIG. 4, timings of the second input periods GT2 of the second gate signals (G21, G22, G23, and G24) are longitudinally overlapped. However, the present disclosure is not limited thereto. Please refer to FIG. 5. In another embodiment, the frequency of the second gate signals (G21, G22, and G23) enables the second input periods GT2 of each of the second gate signals (G21, G22, and G23) to not overlap each other. In a variant embodiment of FIG. 5, since the gate line signal changes less during the period the touch sensor module 2 is activated, influence from noise in the display panel 3 on the touch sensor module 2 may be reduced. The above contents are merely used as examples, in the actual application, as long as the signal output frequency of the gate driver circuit 1 to the display panel 3 during the period of the touch input signal TC is smaller than the signal output frequency during a period other than the touch input signal TC, the implement is included in the scope of the present disclosure.

In summary, in the present embodiment, noise of the display panel 3 is reduced by controlling the gate driver circuit 1 to reduce the output frequency during the period of the touch input signal TC, and interference of signal variance of the display panel 3 on the touch input signal TC during the period of the touch input signal TC is reduced so that signal to noise ratio is increased.

The Second Embodiment

Figure 6:
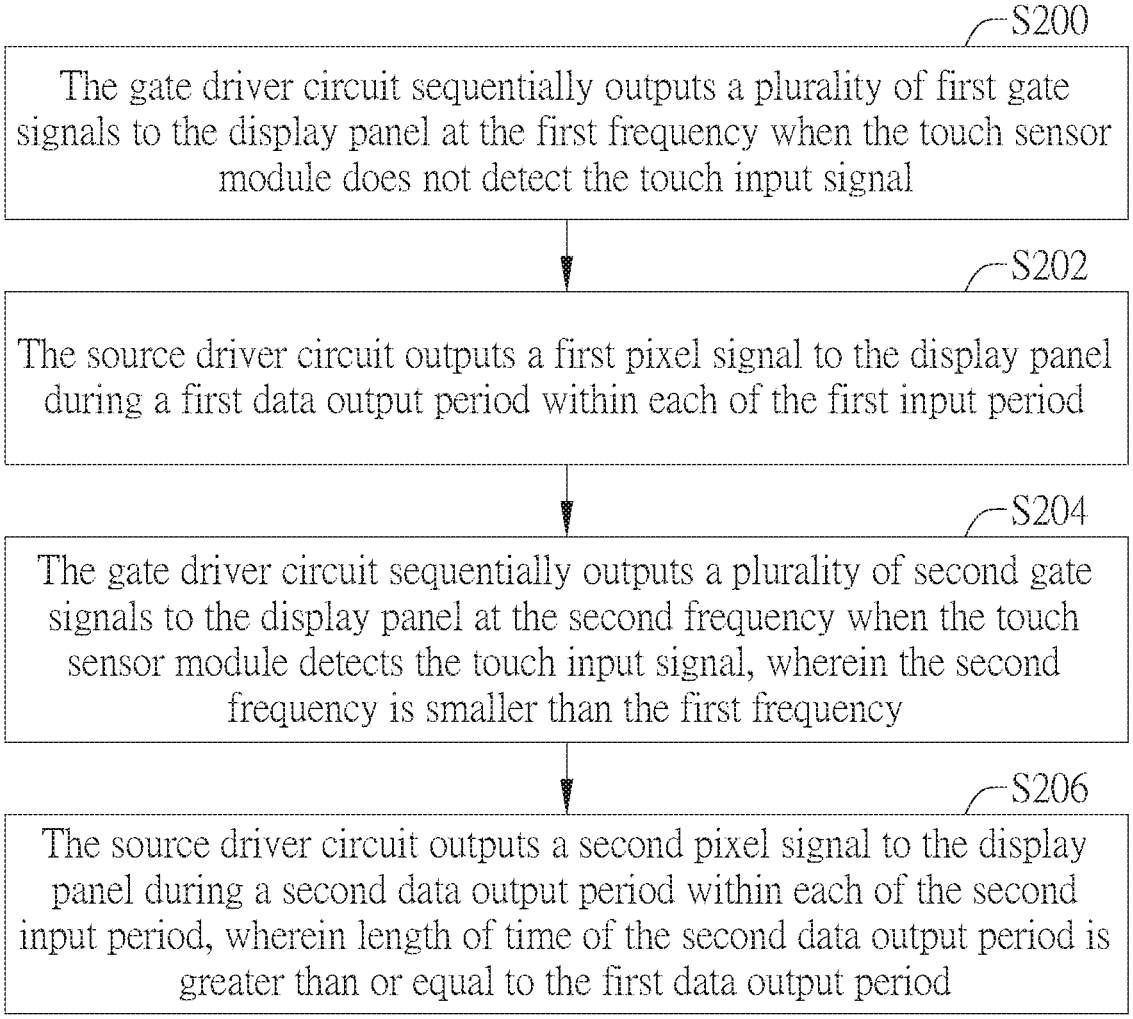
FIG. 6 is a flowchart of the touch display method of the second embodiment of the present disclosure.
Figure 7:
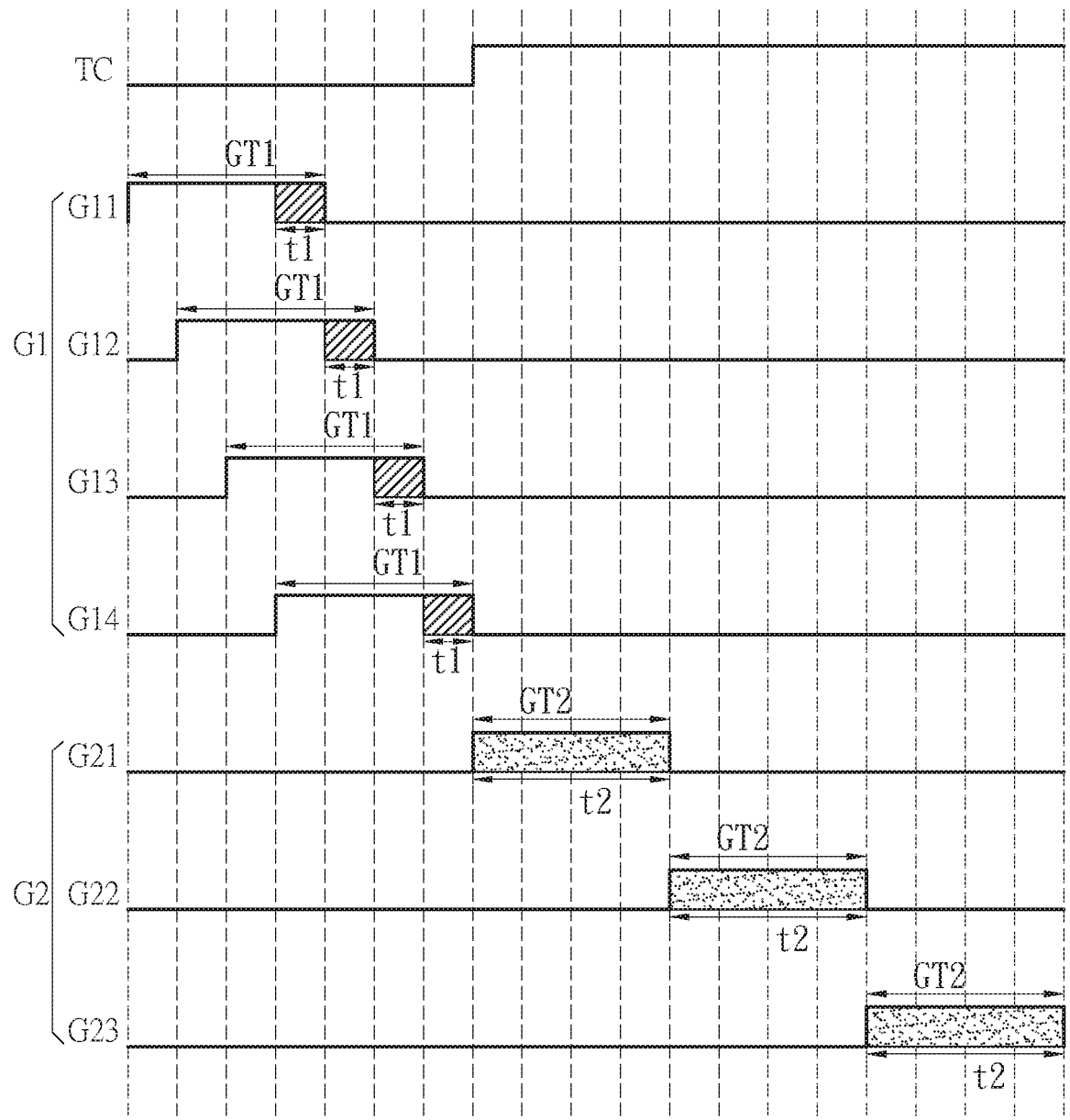
FIG. 7 illustrates a waveform generated when operating the touch display device of the second embodiment of the present disclosure according to the touch display method illustrated in FIG. 6.

Please refer to FIG. 2, FIG. 6, and FIG. 7. FIG. 6 is the touch display method of the second embodiment of the present disclosure. FIG. 7 illustrates a waveform generated when operating the touch display device of the second embodiment of the present disclosure according to the touch display method illustrated in FIG. 6. The touch display method provided by the second embodiment of the present disclosure includes at least the following steps. Step S200: the gate driver circuit 1 sequentially outputs a plurality of first gate signals G1 to the display panel 3 at the first frequency when the touch sensor module 2 does not detect the touch input signal TC; step S202: the source driver circuit 4 outputs a first pixel signal to the display panel 3 during a first data output period t1 within each of the first input period GT1; step S204: the gate driver circuit 1 sequentially outputs a plurality of second gate signals G2 to the display panel 3 at the second frequency when the touch sensor module 2 detects the touch input signal TC, wherein the second frequency is smaller than the first frequency; and step S206: the source driver circuit 4 outputs a second pixel signal to the display panel 3 during a second data output period t2 within each of the second input period GT2, wherein length of time of the second data output period t2 is greater than or equal to the first data output period t1.

The present embodiment may further decrease the number of times of signal variance of the display panel 3 during the period of the touch input signal TC by modulating output modes of the source driver circuit 4. Specifically, please refer to FIG. 6 and FIG. 7. The step S200 and the step S202 of the present embodiment correspond to FIG. 7 before the touch input signal TC is started to be transmitted. Then, the source driver circuit 4 is configured to output the first gate signals at the first frequency (G11, G12, G13, and G14), and the source driver circuit 4 is configured to output the first pixel signal (slashes shown in FIG. 7) during the first data output period t1 of the first input period GT1 of the first gate signals (G11, G12, G13, and G14). In detail, the driving mode of the gate driver circuit 1 of the present embodiment is 4-phase pulse, wherein each of the gate signals (G11, G12, G13, G14, G21, G22, and G23) has the same input periods, and the length of time of the second data output period t2 is four times the first data output period t1. However, the present disclosure is not limited thereto. For example, in another variant embodiment, the timing controller 5 may control the gate driver circuit 1 to output the gate signal to the display panel 3 at 2-phase pulse, 8-phase pulse or 16-phase pulse.

Please refer to FIG. 6 and FIG. 7 again. The step S204 and the step S206 correspond to FIG. 7 after the touch input signal TC starts to be transmitted, then the gate driver circuit 1 is configured to output the second gate signals (G21, G22, and G23) at the second frequency, and the source driver circuit 4 is configured to output the second pixel signal (shown as screentones in FIG. 7) during the second data output period t2 within the second input period GT2 of the second gate signals (G21, G22, and G23). The first pixel signal and the second pixel signal of the present embodiment, for example, may be a pixel voltage input to an unique pixel unit, or a pixel voltage sequentially input to three sub-pixels. In the latter case, switching charge data lines may be conducted by multiplexers; however, the present disclosure is not limited thereto.

Furthermore, in the embodiment shown in FIG. 7, the length of time of the second data output period t2 is equal to the length of the time of the second input period GT2. However, the present disclosure is not limited thereto. In the variant embodiment shown in FIG. 8, the length of the time of the second data output period t2 is only half of that of the second input period GT2. Specifically, in the actual application, the length of the second data output period t2 may be adjusted based on requests. As long as the length of the second data output period t2 is equal to or greater than the length of the first data output period t1, it is included in the scope of the present disclosure. If the length of the second data output period t2 is not smaller than the length of the first data output period t1, one can ensure that a charging rate of the pixel voltage during the period of the touch input signal TC is not smaller than the charging rate during a period other than the touch input signal TC. Thus, the level of intensity of outputting pixel voltage during the period of the touch input signal TC may be reduced resulting the noise in the display panel 3 affecting the touch input signal TC.

Figure 8:
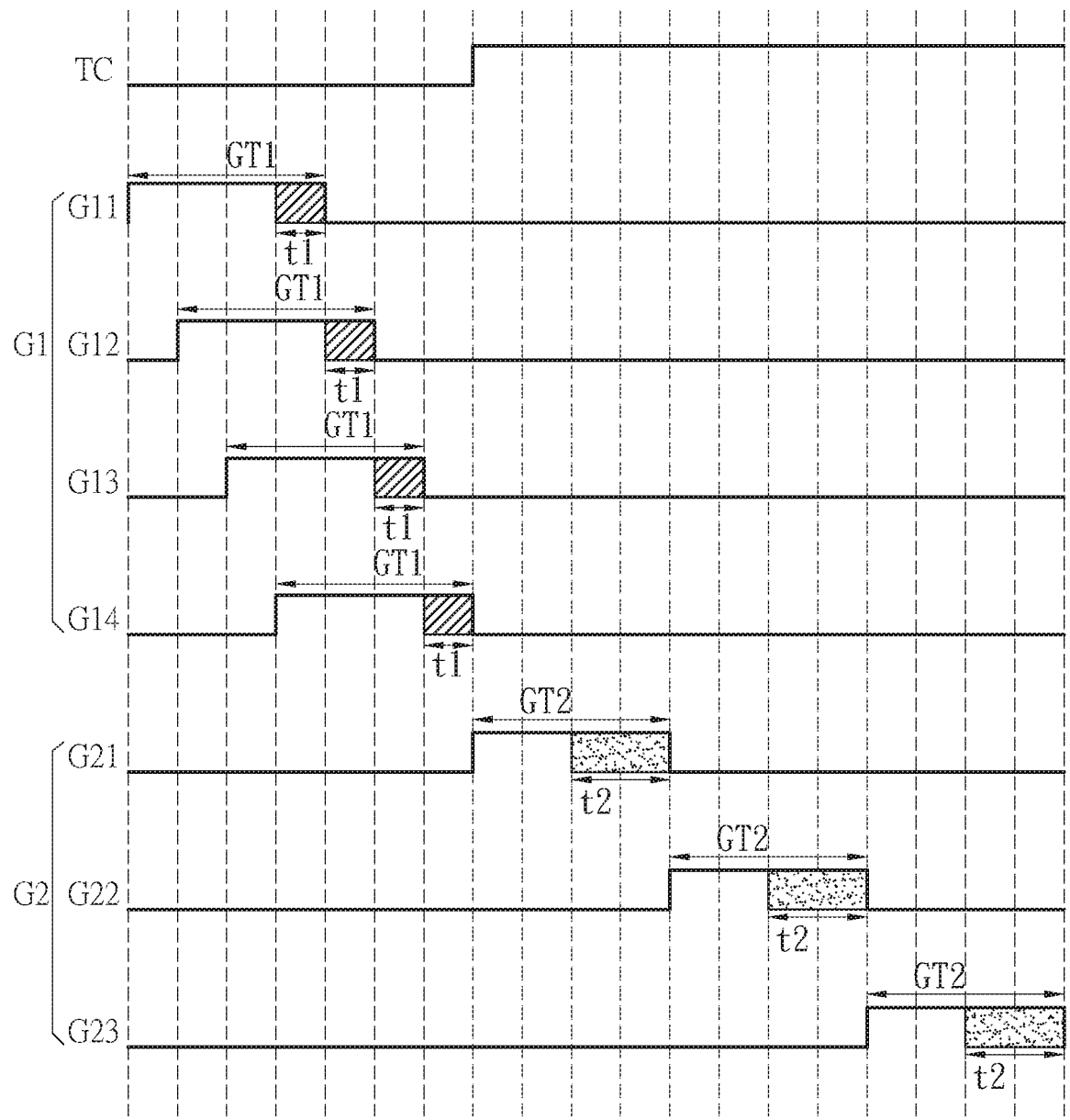
FIG. 8 illustrates a variant embodiment of the waveform generated when operating the touch display device of the second embodiment of the present disclosure according to the touch display method illustrated in FIG. 6.

On the other hand, in the embodiment shown in FIG. 7 and FIG. 8, since the length of the second data output period t2 is greater than the length of the first data output period t1, the number of signal variation in the display panel 3 during the touch input period may be preferably reduced so that influence of noise on the touch input signal TC may be reduced on one hand, and the charging rate of the pixel may be enhanced on the other hand. For example, if the source driver circuit 4 respectively inputs the first pixel signal and the second pixel signal to three pixels by switching multiplexers during the first data output period t1 and the second output period t2 in the embodiment of FIG. 8, the number of times the multiplexers switch during the period of the touch input signal TC will be smaller than the number of times the multiplexers switch per unit time during a period other than the period of the touch input signal since the length of the second data output period t2 is greater than the length of the first data output period t1.

In addition, if the length of the second data output period t2 is greater than the length of the first data output period t1 and smaller than the length of the second input period GT2, since the display panel 3 has no additional signal variance during the remaining time of the second input period GT2 with the second data output period t2 deducted, the remaining time may be used for the touch sensor module 2 to transmit and receive signals, wherein the detailed conditions will be further described in the third embodiment.

In summary, compared to the first embodiment, the second embodiment of the present disclosure, in addition to reducing the output frequency during the period of the touch input signal TC by controlling the gate driver circuit 1, further controls the source driver circuit 4 so that the second data output period t2 is equal to or greater than the first data output period t1 during the period of the touch input signal TC. Thus, the interference on the touch input signal TC due to the source driver circuit 4 inputting the second pixel signal to the display panel 3 during the period of the touch input signal TC may be reduced, and the charging rate to the pixel may be enhanced.

The Third Embodiment

Figure 9:
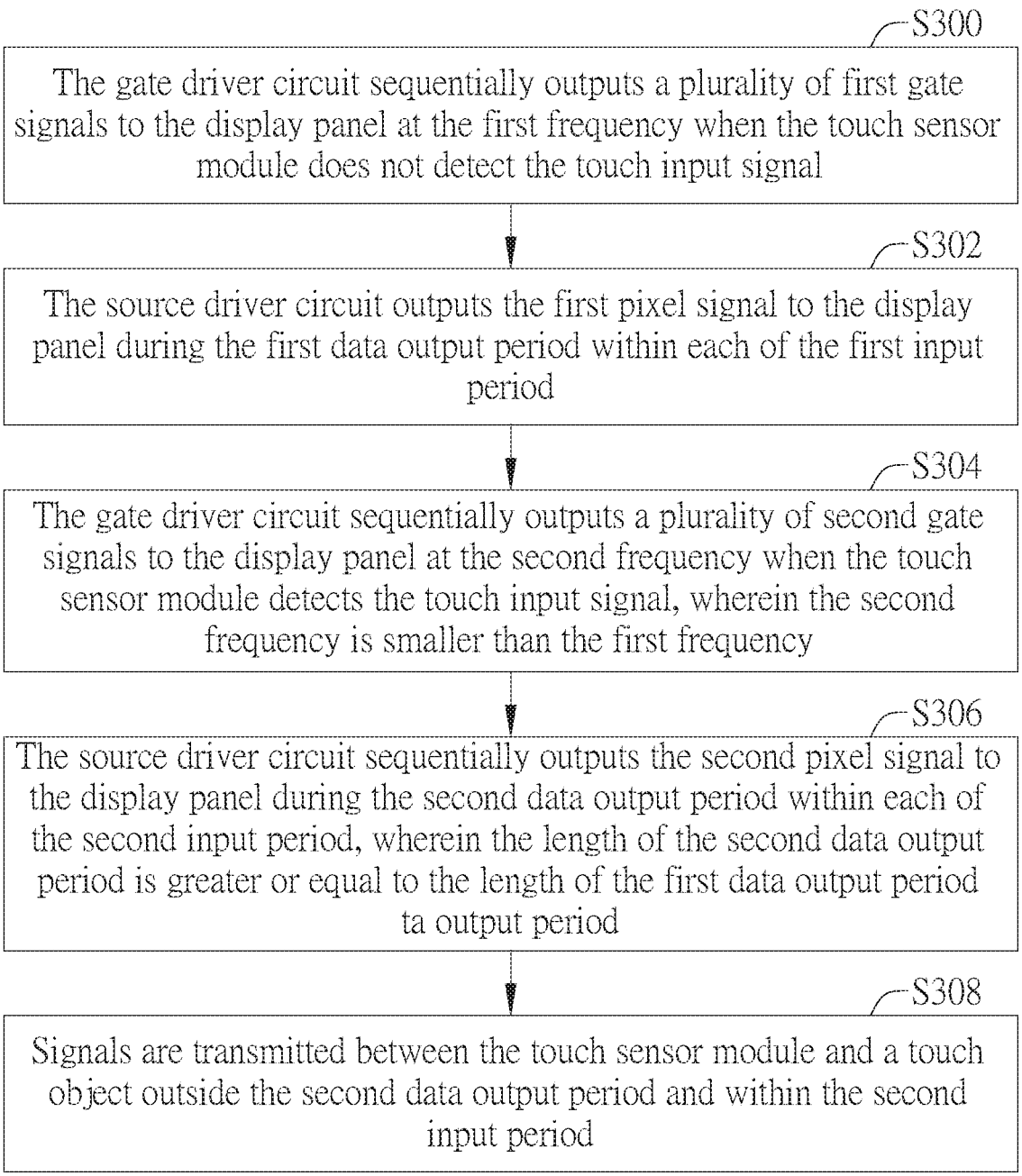
FIG. 9 is a flowchart of the touch display method of the third embodiment of the present disclosure.
Figure 10:
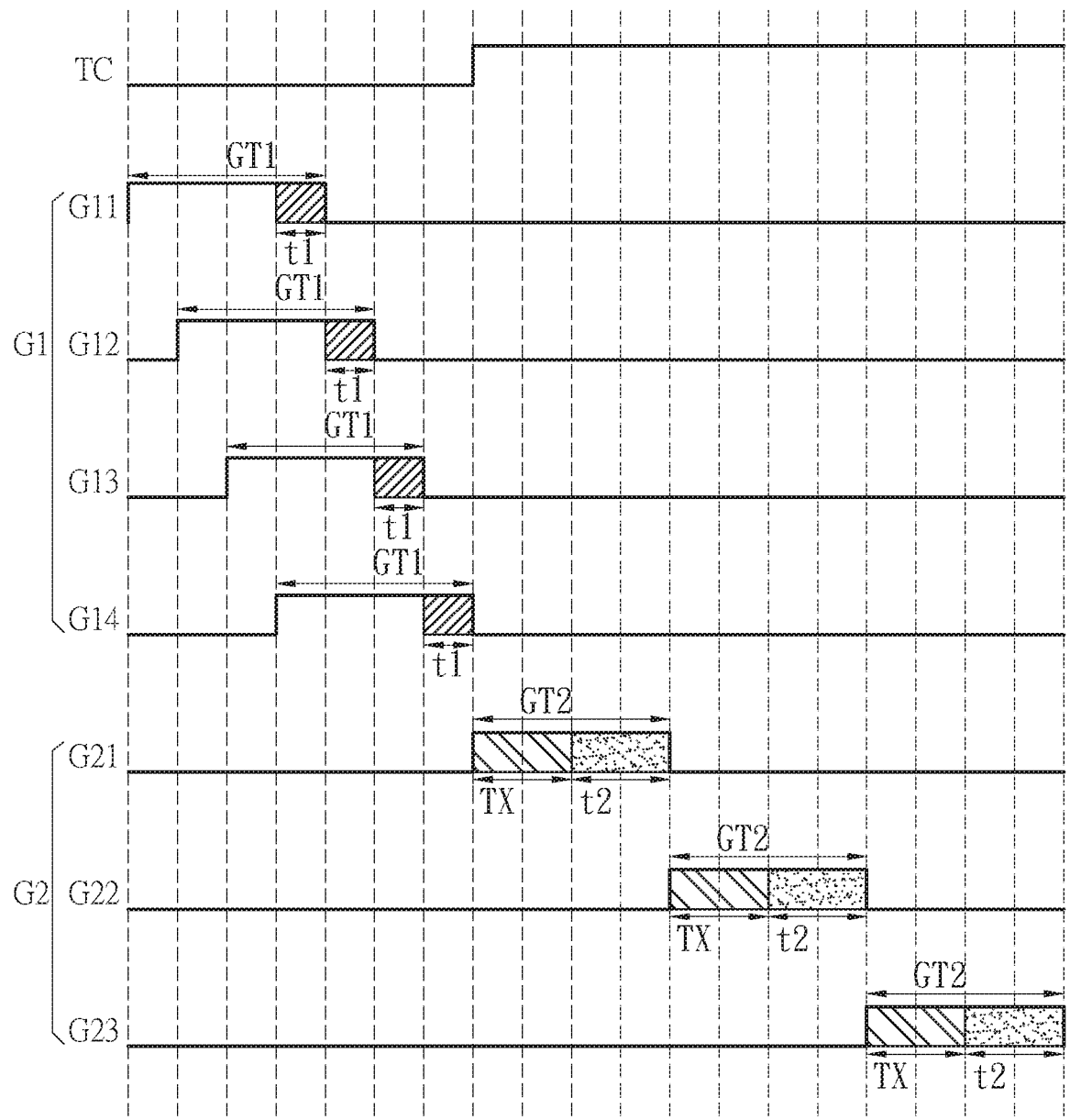
FIG. 10 illustrates a variant embodiment of the waveform generated when operating the touch display device of third embodiment of the present disclosure according to the touch display method illustrated in FIG. 9.

Please refer to FIG. 9 and FIG. 10. Comparing the prior embodiment with the touch display method and the touch display device provided by the third embodiment of the present disclosure, the difference is as follows: In the present embodiment, the remaining time of the second input period GT2 with the second data output period t2 deducted is used for the signal transmission and reception when a touch object P of the display panel 3 touches the touch sensor module 2.

Specifically, please refer to FIG. 2, FIG. 9, and FIG. 10, wherein FIG. 9 is a flowchart of a touch display method in the third embodiment of the present disclosure; FIG. 10 is a diagram of waveforms generated when the touch display device Z of the present embodiment is operated according to the touch display method illustrated in FIG. 9. The touch display method of the present embodiment includes at least the following steps. Step S300: the gate driver circuit 1 sequentially outputs a plurality of first gate signals to the display panel at the first frequency when the touch sensor module 2 does not detect the touch input signal TC; step S302: the source driver circuit 4 outputs the first pixel signal to the display panel 3 during the first data output period t1 within each of the first input period GT1; step S304: the gate driver circuit 1 sequentially outputs a plurality of second gate signals to the display panel 3 at the second frequency when the touch sensor module 2 detects the touch input signal TC, wherein the second frequency is smaller than the first frequency; step S306: the source driver circuit 4 sequentially outputs the second pixel signal to the display panel 3 during the second data output period within each of the second input period GT2, wherein the length of the second data output period t2 is greater or equal to the length of the first data output period t1; and step S308: signals are transmitted between the touch sensor module 2 and a touch object P (for example, a touch pen) outside the second data output period t2 and within the second input period GT2.

As shown in FIG. 10, in the touch display method of the present embodiment, the step S300 to the step S306 are the same as the step S200 to the step S206 in the second embodiment; hence the detailed contents will not be described. The main difference between FIG. 10 and FIG. 8 is as follows: in FIG. 10, the touch sensor module 2 is configured to transmit signals to the touch object P or signals are received by the touch object P in touch time TX within the second input period GT2 and outside the second data output period t2. The touch object P, for example, may be an active touch pen shown in FIG. 2, a passive touch pen, or a fingertip, but not limited thereto.

Through the aforementioned technical method, the present disclosure uses the touch time TX where the source driver circuit 4 does not input pixel signals to the display panel 3 during the second input period GT2 to enable the touch sensor module 2 to transmit signals between the touch object P of the display panel 3 in the touch time TX. During the touch time TX, one may use the following method to make the source driver circuit 4 not update the pixel data of the display panel 3. For example, the source driver circuit 4 may input a black screen or 0 pixel data voltage to the display panel 3 during the touch time TX. In another embodiment, the multiplexer between the source driver circuit 4 and the display panel 3 may be stopped during the touch time TX. However, the present disclosure is not limited thereto.

In summary, in the present embodiment, the gate driver circuit 1 outputs the second gate signal at low frequency during the touch input signal TC, and the touch sensor module 2 is activated during the remaining time of the second input period GT2 of the second gate signal with the second data output period t2 deducted. Thus, the present embodiment not only reduces noise per unit time generated by the display panel 3 in the period of the touch input signal TC to avoid influencing the touch input signal TC, but also enhances the time the touch sensor module 2 can be activated with low noise to enhance touch efficiency.

The Fourth Embodiment

Figure 11:
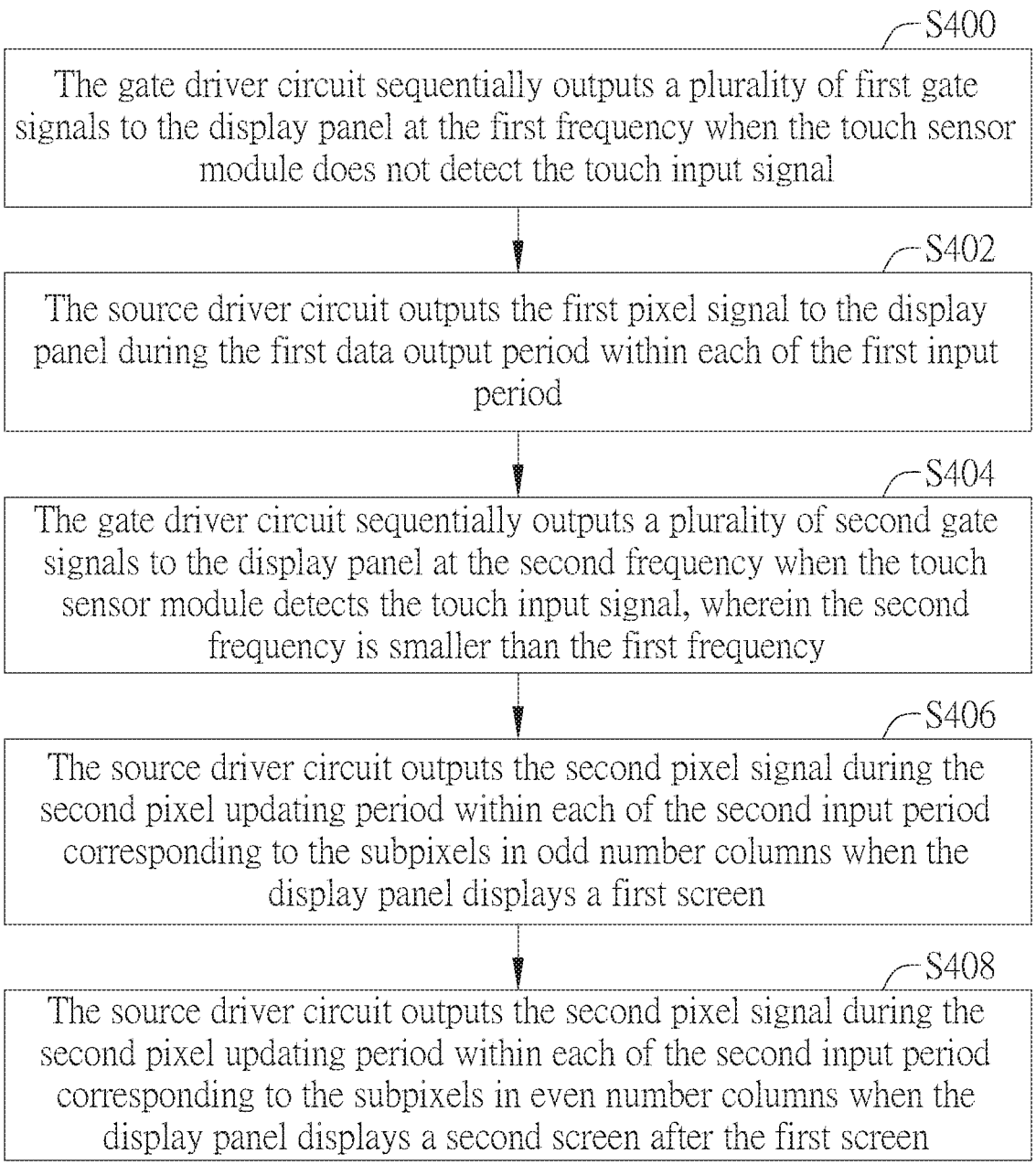
FIG. 11 is a flowchart of the touch display method of the fourth embodiment of the present disclosure.
Figure 12:
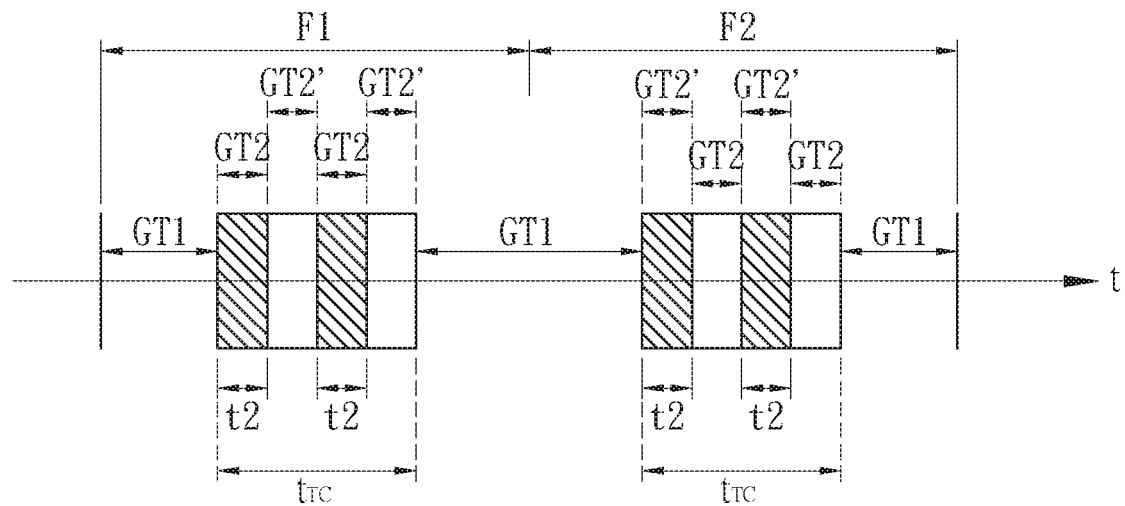
FIG. 12 is a timing diagram of a source driver circuit of the fourth embodiment of the present disclosure outputting a second pixel voltage to the display panel during a touch input signal period.

Please refer to FIG. 11 and FIG. 12. FIG. 11 illustrates the touch display method of the present embodiment; FIG. 12 illustrates a time sequence of the source driver circuit 4 updating pixel voltage of the display panel 3 during the period of the touch input signal TC. Comparing the prior embodiments with the touch display method and the touch display device Z provided by the forth embodiment of the present disclosure, the differences are as follows: in the present embodiment, the display panel 3 includes a plurality of subpixels arranged in an array, and the source driver circuit 4 alternately updates subpixels of each frame screens in odd number columns and even number columns in the display panel 3 during the period of the touch input signal TC.

In detail, please refer to FIG. 2, FIG. 11, and FIG. 12. The touch display method provided by the present embodiment includes at least the following steps: step S400: the gate driver circuit 1 sequentially outputs a plurality of first gate signals to the display panel 3 at the first frequency when the touch sensor module 2 does not detect the touch input signal TC; step S402: the source driver circuit 4 outputs the first pixel signal to the display panel 3 during the first data output period t1 within each of the first input period GT1; step S404: the gate driver circuit 1 sequentially outputs a plurality of second gate signals to the display panel 3 at the second frequency when the touch sensor module 2 detects the touch input signal TC, wherein the second frequency is smaller than the first frequency; step S406: the source driver circuit 4 outputs the second pixel signal during the second pixel updating period t2 within each of the second input period GT2 corresponding to the subpixels in odd number columns when the display panel 3 displays a first screen F1; and step S408: the source driver circuit 4 outputs the second pixel signal during the second pixel updating period t2 within each of the second input period GT2 corresponding to the subpixels in even number columns when the display panel displays a second screen F2 after the first screen F1.

Please refer to FIG. 12. Specifically, the step S400 to the step S404 of the present embodiment are same as the step S200 to the step S204 of the second embodiment. The main differences between the two embodiments are as follows: in the step S206, the source driver circuit 4 outputs the second pixel signal during the second input period GT2 of each of the second gate signal G2; that is, pixel voltage of subpixels in each column of the display panel 3 is updated; and in the step S406 of the present embodiment, the display panel 3 displays the first screen F1 and detects a touch input signal period tTC, and the gate driver circuit 1 outputs the second gate signal during the second input periods (GT2, and GT2'). At that time, the source driver circuit 4 updates the pixel voltage 2 of the subpixels in odd number columns only during the second input period GT of the second gate signal which opens the subpixels in odd number columns. In other words, the source driver circuit 4 will not output the pixel voltage to the second gate signal which opens the subpixels in even number columns during the second input period GT2' when the first screen F1 is displayed and the touch input signal is detected. Furthermore, in the step S408, the display panel displays the second screen F2l and detects the touch input signal period tTC. The gate source circuit 1 outputs the second gate signal which includes the second input periods (GT2, and GT2'). At that time, the source driver circuit 4 updates the pixel voltage of the subpixels in even number columns only during the second input period GT2' of the second gate signal which opens subpixels in even number columns. In other words, regarding the second gate signal which opens subpixels in odd number columns during the period of the second screen F2, the source driver circuit 4 will not update the pixel voltage of subpixels in odd number columns during the second input period GT2. Since images generated by the light beam in retinas will be kept for a period of time after the actual image disappears (In general, it is known as the persistence of vision phenomenon), only half of the subpixels are updated in each of the frame screen in the present embodiment through the technical method. In addition to not affecting users of the display panel 3 in their view, the frequency of signal update in the display panel 3 may be further reduced.

It should be noted that in the embodiment of FIG. 12, the length of the second data output period t2 is the same as the length of the second data input period (GT2, and GT2'); however, the present disclosure is not limited thereto. As described above, as long as the second data output period t2 is equal to or greater than the first data output period t1, it is included in the scope of the present disclosure. In addition, to describe the technical features of the present embodiment clearly, FIG. 12 merely illustrates the second pixel voltage output of the source driver circuit 4 during the touch input signal period. The first pixel voltage output during the first input period GT1 when the source driver circuit 4 does not detect the touch input signal TC is not illustrated.

In summary, the source driver circuit 4 uses the time of two of the frame display screens (F1, and F2) to update all subpixels of the display panel 3 during the second input period (GT2, and GT2') when the touch input signal TC is detected by the touch input display method and the touch input display device provided by the present embodiment, wherein in the first screen F1, the source driver circuit 4 outputs the second pixel signal to the subpixels in odd number columns; in the second screen F2, the source driver circuit 4 outputs the second pixel signal to the subpixels in even number columns. Thus, the present embodiment uses the persistence of vision phenomenon of human eyes so that, on one hand, visual perception of the user looking at the display panel 3 is not affected, and, on that other hand, the number of times of signal variance of the display panel 3 may be further reduced, and the influence of noise in the display panel 3 on the touch input signal TC may be reduced.

The Fifth Embodiment

Figure 13:
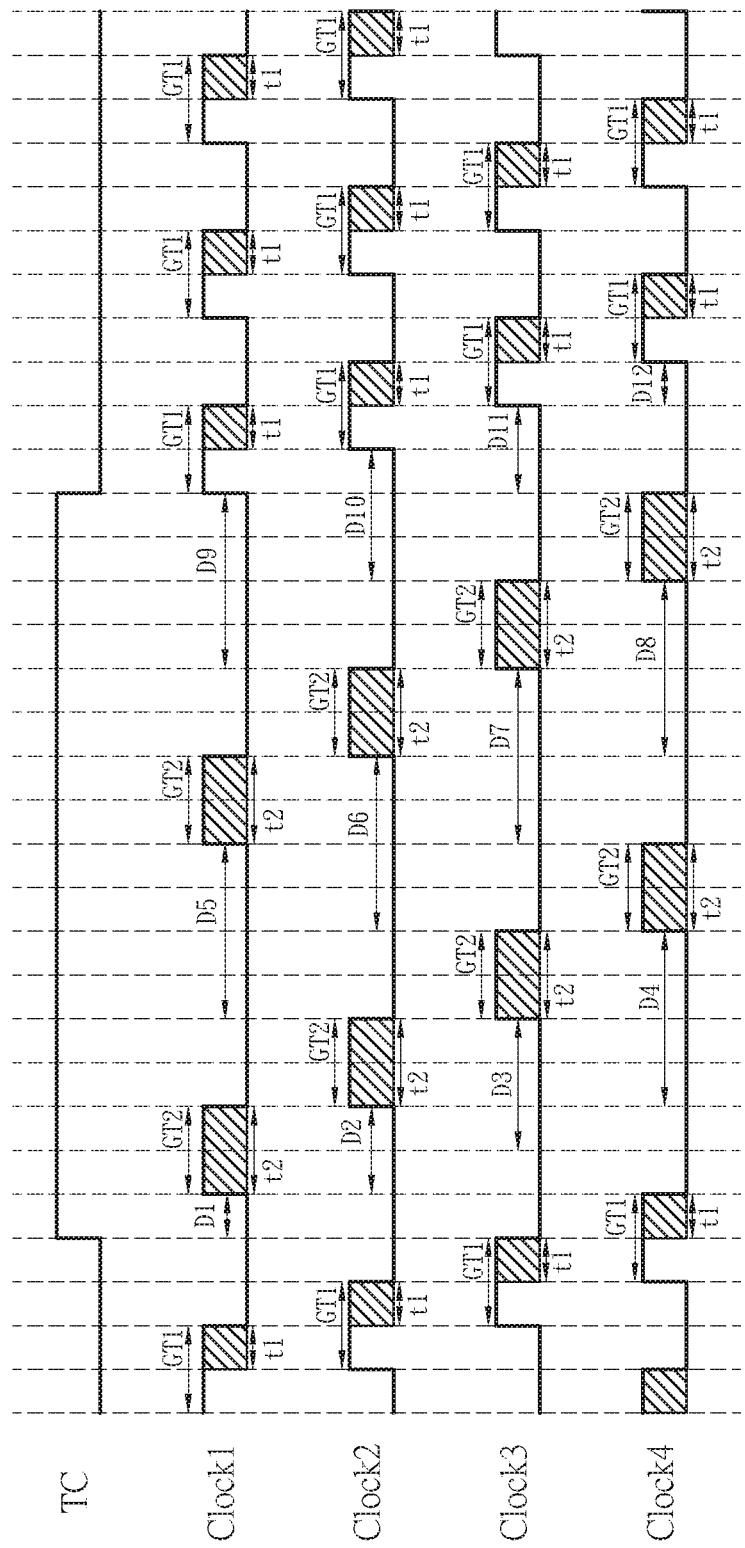
FIG. 13 is a timing diagram of a timing controller of the fifth embodiment of the present disclosure outputting signals.

Please refer to FIG. 2 and FIG. 13. The present embodiment provides an implementation of a touch display method and a touch display device to achieve the touch display methods and the touch input display devices in the first to the fifth embodiments. In particular, the present embodiment delays the output frequency of the gate driver circuit 1 during the period of the touch input signal TC using the timing controller 5 of the touch display device Z so that the second frequency which outputs the second gate signal during the period of the touch input signal TC is smaller than the first frequency which outputs the first gate signal during a period other than the period of the touch input signal TC.

For example, please refer to FIG. 2 and FIG. 13. The timing controller 5 of the present embodiment sequentially inputs clock signals (Clock1, Clock2, Clock3, and Clock4) to the gate driver circuit 1 at the first frequency before the period of the touch input signal TC; the gate driver circuit 1 sequentially outputs the first gate signal based on the time sequence of the clock signals (Clock1, Clock2, Clock3, and Clock4). Thus the input time of the clock signals (Clock1, Clock2, Clock3, and Clock4) is equal to the first input period GT1. When the touch input signal TC begins, in order to keep the second frequency which outputs the second gate signal lower than the first frequency, more specifically, in the present embodiment, in order to prevent each of the second input period GT2 within the period of the touch input signal TC from overlapping each other, the first clock signal Clock1 is delayed for a delay time D1 of a unit of time. Then, the second clock signal Clock2 is delayed for a delay time D2 of two units of time; the third clock signal Clock3 is delayed for a delay time D3 of three units of time; the forth clock signal Clock4 is delayed for a delay time D4 of four units of time so that the second input periods GT2 of the second gate signal do not overlapp each other and the noise occurrence rate in the display panel 3 may be reduced. Thus, it is possible to avoid fast variation of the signals of the display panel 3 during the period of the touch input signal TC, which in turn affects the touch input signal TC.

Please refer to FIG. 13. The clock signals (Clock1, Clock2, Clock3, and Clock4) will keep the delay time (D5, D6, D7, and D8) of four units of time during the period of the touch input signal TC so that the second input periods GT2 of each of the second gate signal are kept from overlapping each other. When the touch input signal TC ends, the second clock signal Clock2, the third clock signal Clock3, and the forth clock signal Clock4 drive the gate driver circuit 1 with sequentially reduced delay time, which are the delay time D10 of three units of time, the delay time D11 of two units of time, and the delay time D12 of one unit of time respectively. Finally, the timing controller 5 recovers to drive the gate driver circuit 1 to output the first gate signal during the first input period GT1 at the first frequency.

The length of time of the pixel signals output by the source driver circuit 4 to the display panel 3 is illustrated by the slashes in the timing diagram of the present embodiment in FIG. 13. Furthermore, in the present embodiment during the period of the touch input signal TC, the second data output period t2 is twice the first data output period t1 of the period other than the period of the touch input signal TC so that the pixel charging rate during the period of the touch input signal TC may be enhanced. However, the present disclosure is not limited thereto. As mentioned above, as long as the second data output period t2 is equal to or greater than the first data output period t1, it is included in the scope of the present disclosure.

The Sixth Embodiment

Figure 14:
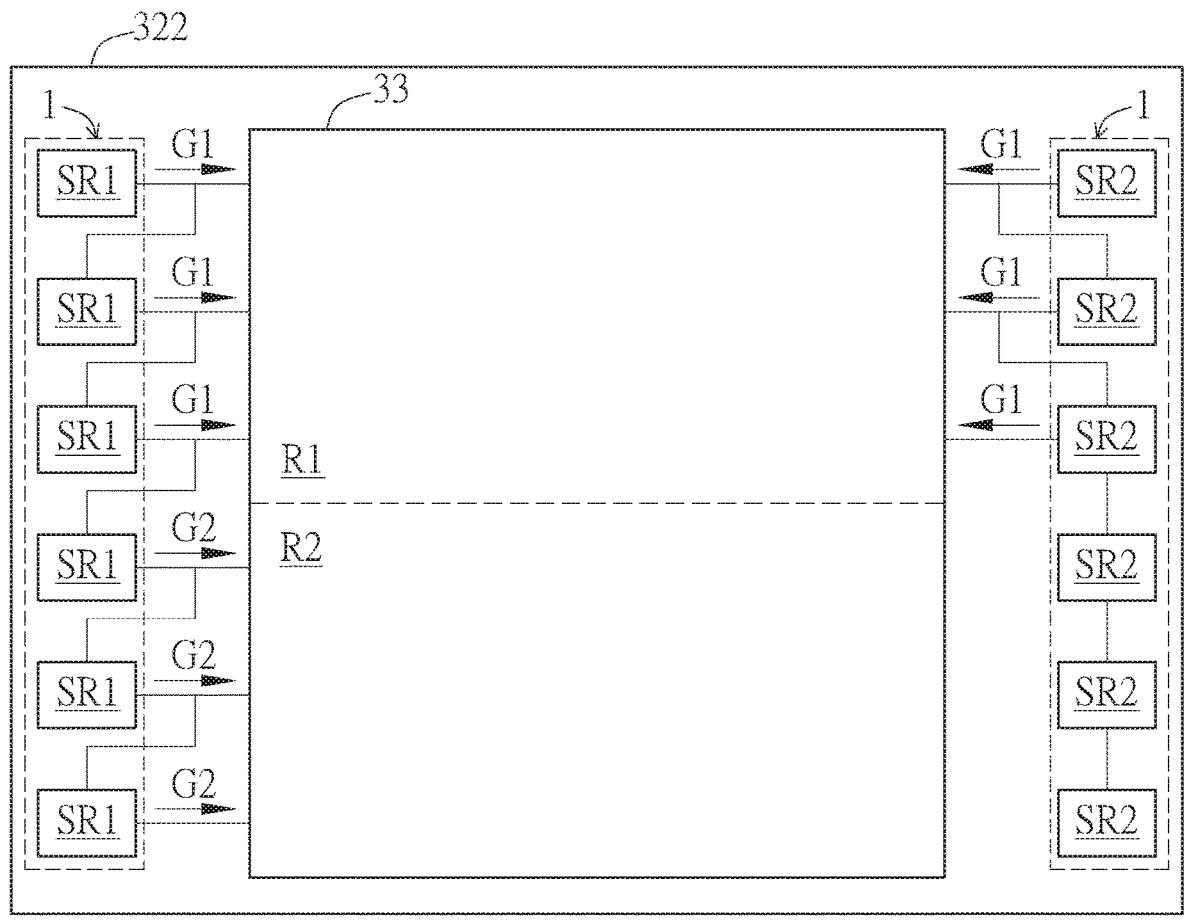
FIG. 14 is a diagram of the display panel of the sixth embodiment of the present disclosure.

Please refer to FIG. 14. The sixth embodiment of the present disclosure provides another implement of a touch input method and a touch input display device to achieve the first to the fourth embodiments. In the fifth embodiment, the timing controller 5 controls the gate driver circuit 1 to output the second gate signal at the second frequency which is smaller than the first frequency; but in the present embodiment, the condition that the second frequency is smaller than the first frequency during the period of the touch input signal TC is achieved by changing the output connecting positions of the wires of the gate driver circuit 1.

In detail, please refer to FIG. 14. A gate driver circuit substrate (Gate on Array, GOA) structure is used in the gate driver circuit 1 of the present embodiment; that is, the gate driver circuit 1 is produced on the lower substrate 322 of the display panel 3 and next to the TFT array 33 (TFT Array). in order to illustrate clearly, the display panel 3 in FIG. 14 illustrates only the lower substrate 322, the TFT array 33, and the gate driver circuit 1; the other components are not illustrated. Furthermore, as shown in FIG. 14, the display panel 3 has a normal display area R1 and at least one touch display areas R2. The single touch display area R2 is taken as an example in the present embodiment; however, the present disclosure is not limited thereto. In another variant embodiment, the display panel 3, for example, may have more than two touch display areas R2, and the touch display areas R2, for example, may be disposed between the normal display areas R1 alternately.

Please refer to FIG. 14 again. The gate driver circuit 1 is disposed on two opposite sides of the TFT array 33, wherein the gate driver circuit 1 has a plurality of first shift registers SR1 on the left side of the TFT array 33 and a plurality of second shift registers SR2 on the right side of the TFT array 33. The ends of each of the first shift registers are sequentially coupled to each other, and the ends of each of the second shift registers SR2 are sequentially coupled to each other. The ends of the first shift registers SR1 and the second shift registers SR2 corresponding to the normal display area R1 are coupled to the normal display area R1 so as to output the first gate signal to the display panel at the first frequency, and the end of the first shift registers SR1 corresponding to the touch display area R2 is coupled to the touch display area R2 so as to output the second gate signal to the touch display area R2 at the second frequency. The second shift registers SR2 corresponding to the touch display area R2 is coupled to the touch display area R2 indirectly.

Through the aforementioned technical method, in the present embodiment, since the second shift registers SR2 corresponding to the touch display area R2 are partially not coupled to the touch display area R2, signal output frequency of the gate driver circuit 1 will be halved when the gate driver circuit 1 corresponding to two opposite sides of the touch display area R2 is activated. Thus, in the present embodiment, for example, during the period of the touch input signal TC, the first shift registers SR1 and the second shift registers SR2 on the two opposite sides of the touch display area R2 can be used to display images so that the signal output frequency of the gate driver circuit 1 during the period of the touch input signal TC may be smaller than the signal output frequency during the period other than the period of the touch input signal TC, that is, satisfying the condition that the second frequency is smaller than the first frequency.

In summary, the touch display method and the touch display device provided by embodiments of the present disclosure reduces the frequency of the signal variance through the technical method that "the gate driver circuit 1 sequentially outputs the plurality of first gate signals G1 to the display panel 3 at the first frequency when the touch sensor module 2 does not the touch the input signal TC" and that "the gate driver circuit 1 sequentially outputs a plurality of second gate signals G2 to the display panel 3 at the second frequency when the touch sensor module 2 detects the touch input signal TC, wherein the second frequency is smaller than the first frequency."

What is claimed is:

1. A touch display method for driving a touch display device comprising a gate driver circuit, a timing controller, a touch sensor module, and a display panel, the touch display method comprising:

the gate driver circuit sequentially outputting a plurality of first gate signals to the display panel at a first frequency when the touch sensor module does not detect a touch input signal; and the gate driver circuit sequentially outputting a plurality of second gate signals to the display panel at a second frequency when the touch sensor module detects the touch input signal, wherein the second frequency is smaller than the first frequency;

wherein the step of the gate driver circuit sequentially outputting the plurality of second gate signals to the display panel at the second frequency when the touch sensor module detects the touch input signal further comprises:

the timing controller sequentially outputs a plurality of delay signals to the gate driver circuit when the touch sensor module detects the touch input signal, so that the gate driver circuit is switched from outputting the plurality of first gate signals at the first frequency to outputting the plurality of second gate signals at the second frequency.

2. The touch display method according to claim 1, wherein each of the second gate signals is outputted during an input period, and the input periods of different second gate signals do not overlap each other.

3. The touch display method according to claim 1, wherein each of the first gate signals is outputted during a first input period, each of the second gate signals is outputted during a second input period, the touch display device comprises a source driver circuit, and the touch display method further comprising:

the source driver circuit outputs a first pixel signal to the display panel during a first data output period within each of the first input periods; and the source driver circuit outputs a second pixel signal to the display panel during a second data output period within each of the second input periods, wherein the length of time of the second data output period is greater than or equal to the length of time of the first data output period.

4. The touch display method according to claim 3, wherein the second data output period is equal to the second input period.

5. The touch display method according to claim 3, wherein the length of time of the second data output period is smaller than the length of time of the second input period, and the touch display method further comprises;

transmitting signals between the touch sensor module and a touch object outside the second data output period and within the second input period.

6. The touch display method according to claim 3, wherein the display panel comprises a plurality of subpixels arranged in an array, and the touch display method further comprises;

when the display panel displays a first screen, the source driver circuit outputs the second pixel signal during a second pixel updating period within each of the second input periods corresponding to the subpixels in odd number columns; and when the display panel displays a second screen after the first screen, the source drive circuit outputs the second pixel signal during the second pixel updating period within each of the second input periods corresponding to the subpixels in even number columns.

7. A touch display device, comprising:
a display panel;
a touch sensor module integrated on the display panel;
a gate driver circuit coupled to the display panel, the gate driver circuit configured to sequentially output a plurality of first gate signals to the display panel at a first frequency when the touch sensor module does not detect a touch input signal and configured to sequentially output a plurality of second gate signals to the display panel at a second frequency when the touch sensor module detects the touch input signal,
wherein the second frequency is smaller than the first frequency; and
a timing controller configured to sequentially output a plurality of delay signals to the gate driver circuit when the touch sensor module detects the touch input signal, so that the gate driver circuit is switched from outputting the plurality of first gate signals at the first frequency to outputting the plurality of second gate signals at the second frequency.

8. The touch display device according to claim 7, wherein the display panel has a normal display area and at least one touch display area, the gate driver circuit comprises a plurality of first shift registers and a plurality of second shift registers, the plurality of first shift registers and the plurality of second shift registers are respectively located on two opposite sides of the display panel, wherein first ends of the first shift registers are sequentially coupled to each other, first ends of the second shift registers are sequentially coupled to each other;

wherein a second end of the plurality of first shift registers and the plurality of second shift registers corresponding to the normal display area of the display panel is coupled to the normal display area to output the first gate signals to the display panel at the first frequency; and wherein a second end of each of the first shift registers corresponding to the touch display area of the display panel is coupled to the touch display area to output the second gate signals to the display panel at the second frequency.

9. The touch display device according to claim 8, wherein each of the second shift registers corresponding to the touch display area of the display panel is coupled to the display panel indirectly.

* * * * *